Figure 1:
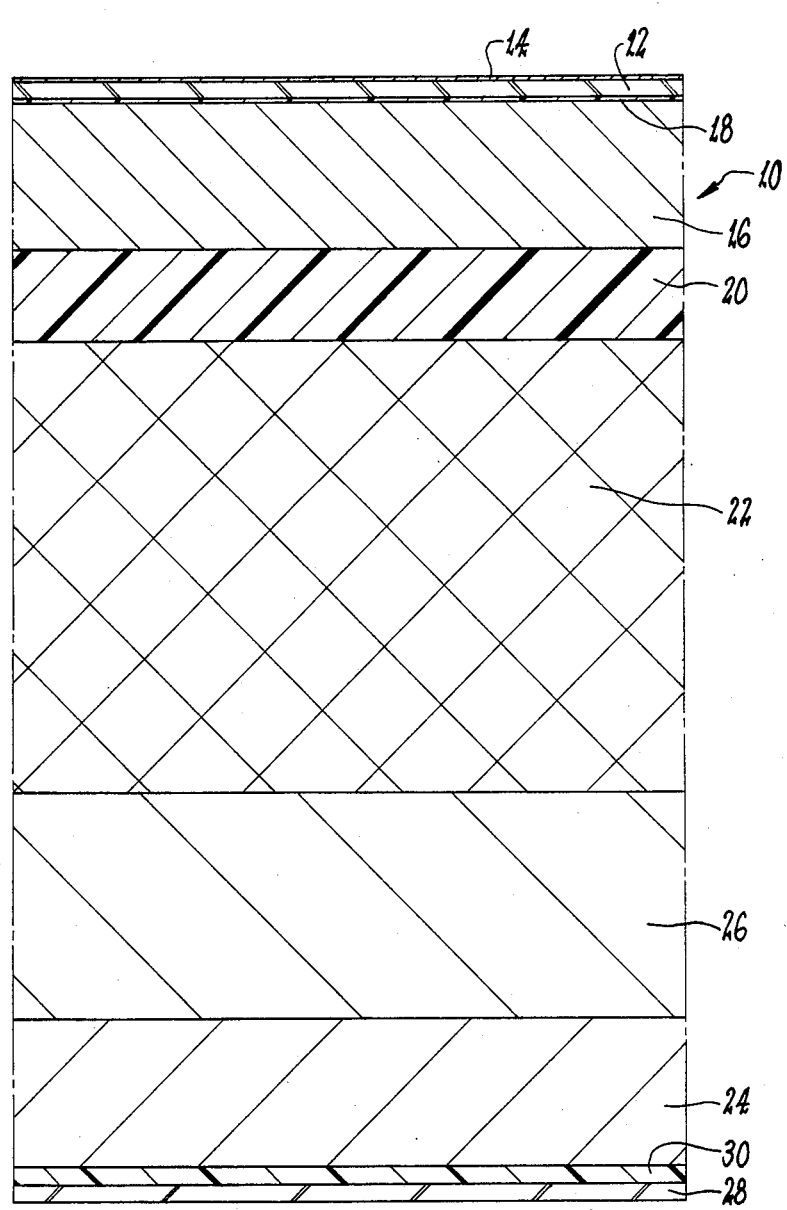

United States Patent [19]

Goodacre et al.

[11] Patent Number: 4,656,082
[45] Date of Patent: Apr. 7, 1987

[54] LAMINATE MATERIAL WITH FIBROUS INNER LAYER

[75] Inventors: Stanley A. Goodacre, Pennant Hills; Anthony E. Blaubaum, Balwyn, both of Australia

[73] Assignee: ACI Australia Limited, Victoria, Australia

[21] Appl. No.: 770,395

[22] Filed: Aug. 28, 1985

[30] Foreign Application Priority Data

Sep. 5, 1984 [AU] Australia .................. PG6959

[51] Int. Cl.[4] .............................................. B32B 7/00
[52] U.S. Cl. .................................... 428/248; 428/249; 428/251; 428/252; 428/285; 428/286
[58] Field of Search ............... 428/248, 249, 251, 252, 428/285, 286, 433, 464, 537.5

[56] References Cited

FOREIGN PATENT DOCUMENTS

| | | |
|---|---|---|
| 216781 | 5/1957 | Australia . |
| 217555 | 5/1957 | Australia . |
| 275666 | 5/1957 | Australia . |
| 996909 | 6/1965 | United Kingdom . |
| 1011342 | 11/1965 | United Kingdom . |
| 2102731A | 2/1983 | United Kingdom . |

Primary Examiner—Marion C. McCamish
Attorney, Agent, or Firm—Merchant, Gould, Smith, Edell, Welter & Schmidt

[57] ABSTRACT

A laminate material suitable for use in place of a safety mesh used in construction of roofing. The laminate has at least one inner layer comprising fibrous material, such as a woven material, adhesively bonded to each of the next adjacent layer. Each next adjacent layer is selected from paper and metal foil.

20 Claims, 2 Drawing Figures

LAMINATE MATERIAL WITH FIBROUS INNER LAYER

This invention relates to an improved laminate material.

It is well known to provide insulating foil or other forms of insulation in the roof cavity of buildings. This can be provided during construction or subsequently. Also, at least under some building regulations, it is necessary to install a steel safety mesh, particularly where relatively wide rafter or truss spacings are used, for the safety of roof construction workers such as tilers, and other working below. Where insulation is installed prior to tiling, the need for a safety mesh is increased, since the insulation can obscure the location of rafters and trusses, and there also is a need to protect the insulation itself. Conventional insulations are unsuitable for the dual purposes of providing insulation and serving as a safety layer in place of a safety mesh.

A safety mesh gives rise to a significant cost factor. This is due to the added installation cost, but also to the material cost since it normally is impractical to remove the mesh for subsequent re-use. Also, unless foil or other insulation is installed prior to the safety mesh, the presence of the latter can complicate subsequent installation of insulation.

The present invention seeks to provide an improved laminate material suitable for use in place of a steel safety mesh. At least in a preferred form, the laminate of the invention also is able to serve as reflective insulation suitable for insulating the roof of a building.

A laminate according to the invention has at least three layers, with at least one inner layer comprising a fibrous layer adhesively bonded to each of the next adjacent layers; with the next adjacent layers being of paper or metal foil.

The fibrous layer, which may be woven or non-woven, may have a density of from about 30 to about 150 g/m$^2$ and comprise fibres of from about 30 to about 150 tex. The fibres most preferably are from about 50 to 100 tex and in a layer of from about 50 to about 120 g/m$^2$. The fibres may be of polymeric material, such as a thermoplastic material; polyolefin fibres being particularly preferred. However, the fibres may be of fibreglass or carbon filament, preferably resin bonded, or of polyester fibre preferably a woven or spun bonded polyester. Also, the fibrous layer may comprise cross-laminated airy fabric, formed from split film which is stretched tentered and heat bonded to a similar cross-layer. Additionally, the fibrous layer can comprise a mixture of fibres of two or more such fibrous materials, while it also can include at least a minor percentage of natural or mineral fibrous material. Where of a thermoplastic, the fibrous material may be biaxially oriented, for increased strength. Most conveniently, the fibrous layer is woven material.

Other layers of the laminate comprise paper, such as Kraft paper, and/or metal foil such as aluminium foil. The laminate may have at least one layer of paper and at least one metal foil layer, with there preferably being two each of those layers. The laminate may comprise an inner layer of fibrous material, with a paper layer over each major surface of that layer and a metal foil layer over the outermost major surface of at least one of the paper layers. Preferably, there is a respective metal foil layer over that surface of each layer.

The respective layers of the laminate are each adhesively bonded together by means of a layer of film of a suitable adhesive material. This may be achieved in successive stages, with each layer being bonded in turn to a preceding layer. Preferably, at least one sub-assembly of two or more layers may be formed in an initial stage and further layers or sub-assemblies adhesively bonded thereto.

In one form, applicable to a five layer laminate, two sub-assemblies, each comprising a paper layer and a metal foil layer, can be used; with a fibrous layer being adhesively bonded to the paper layer of one sub-assembly and thereafter the paper layer of the other sub-assembly. Such procedure has the advantage of enabling preforming of the sub-assemblies, which can be stored in roll form, prior to adhesive bonding of the other sub-assembly, if required.

The adhesive by which at least two adjacent layers of the laminate are bonded together may be of a flame-retardant grade, preferably applied by reverse roll coating. Where the fibrous layer comprises or includes thermoplastic fibrous material, the adhesive by which that layer is bonded to at least one adjacent layer preferably is of that grade and/or type. The flame-retardant adhesive most preferably is a chlorinated paraffin containing antimony oxide or an alternative flameretardant compound dispersed or incorporated therein.

Remaining layers of the laminate may be bonded together by means of any suitable adhesive. Bonding between a metal foil layer and an adjacent paper layer for example, may be by means of a polyvinyl acetate (PVA) adhesive, or a casein latex, acrylic, neoprene or polyolefin adhesive. Particularly in the case of a polyolefin adhesive, this preferably is applied by an extrusion coater between the metal foil and paper layers as those layers are brought into the required overlapping relation. Where other adhesives are used, they may be applied by reverse roll coating or other suitable technique.

In some circumstances, it is convenient to apply a flame-retardant grade of adhesive, such as a chlorinated paraffin including antimony oxide, to only one side of a fibrous layer for bonding the latter to an adjacent layer. In such case, an adhesive such as detailed in the preceding paragraph preferably is used for bonding the other side of the fibrous layer to its adjacent layer. A polyolefin adhesive applied by an extrusion coater most preferably is used. However, where the fibrous layer is a polyolefin, it is highly desirable that the extrusion coated polyolefin be substantially the same as that of the fibrous layer, for compatibility therebetween and optimum bonding.

A particularly preferred laminate according to the invention comprises the following layers and adhesives:

| | | |
|---|---|---|
| 1. | Aluminum foil 7.5 μm | 20.3 g/m$^2$ |
| 2. | Polyvinyl acetate adhesive | 1.5 g/m$^2$ |
| 3. | Kraft paper | 39.0 g/m$^2$ |
| 4. | Polyproylene extrusion | 35.0 g/m$^2$ |
| 5. | 10 × 6 Polypropylene weave | 79.0 g/m$^2$ |
| 6. | Flame retardant adhesive | 250.0 g/m$^2$ |
| 7. | Kraft paper | 39.0 g/m$^2$ |
| 8. | Polyethylene adhesive | 7.0 g/m$^2$ |
| 9. | Aluminum foil 7.5 μm | 20.3 g/m$^2$ |
| | | 491.1 g/m$^2$ |

In such laminate, one of the aluminium foil layers, the uppermost layer in use of the laminate, has its outer surface coated with a film of ink or dye so as to reduce the reflectivity of that surface. Such coating is to prevent burning of workers by reflected sunlight, and may for example be of a thickness resulting in about 1.25 g/m$^2$.

As will be appreciated, the 10×6 polypropylene weave designates a woven polypropylene fabric having 10 yarn ends per inch in the warp (or machine direction) and 6 yarn ends per inch in the weft (cross direction). While the fabric can vary widely in this regard, the parameter of number of yarns per inch is important. Most preferably for a polyolefin, such as polypropylene or polyethylene, at least a 6×4 woven fabric or its equivalent in a non-woven fabric is used; and, while a 20×20 or higher woven fabric or non-woven equivalent can be used, it normally is not necessary to go beyond a 16×16 fabric or non-woven equivalent. Essentially the same number of yarns per inch can be used for a polyester fabric and an equivalent cross-laminated airy fabric, and also to non-woven equivalents for fibreglass and carbon filament.

The laminate is formed, preferably using conventional apparatus, by first bonding layers 1 and 3, by application of adhesive 2. Thereafter, layer 5 is applied over layer 3 as adhesive 4 is extruded therebetween by an extrusion coater to bond layers 3 and 5 together. After bonding together layers 7 and 9, by application of adhesive 8, layers 5 and 6 are bonded together by application of adhesive 6. As will be appreciated, bonding of layers 7 and 9 by adhesive 8 may be performed at any convenient time, either before, during or after producing a sub-structure comprising layers 1, 3 and 5 bonded by adhesive 2 and film 4. Numbers 1, 3, 5, 7 and 9 correspond to respective layers 12, 16, 22, 24 and 28 described hereinafter with reference to FIG. 1. Numbers 2, 4, 6 and 8 similarly correspond to respective adhesive layers 18, 20, 26 and 30 of FIG. 1.

In a variant of the described laminate, one of the layers 3, 7 can be omitted, with corresponding omission of adhesive 2 or 8, respectively. However, the resultant laminate then is more prone to cracking of the respective foil layer 1 or 9 which is not directly supported by having a paper layer bonded directly thereto. In further alternatives, adhesives 2, 8 may be the same, whether a PVA adhesive, or a polyethylene adhesive. Also, one or both of adhesives 2, 8 can be substituted by alternative adhesive such as detailed herein. Additionally, adhesive 4 can be omitted, with bonding between layers 3, 5 being by means of a flame-retardant adhesive as used for adhesive 6; such variant enabling a reduction in the amount of adhesive 6 between layers 5, 7 provided that over all flameretardancy for the laminate is retained.

Figure 2:
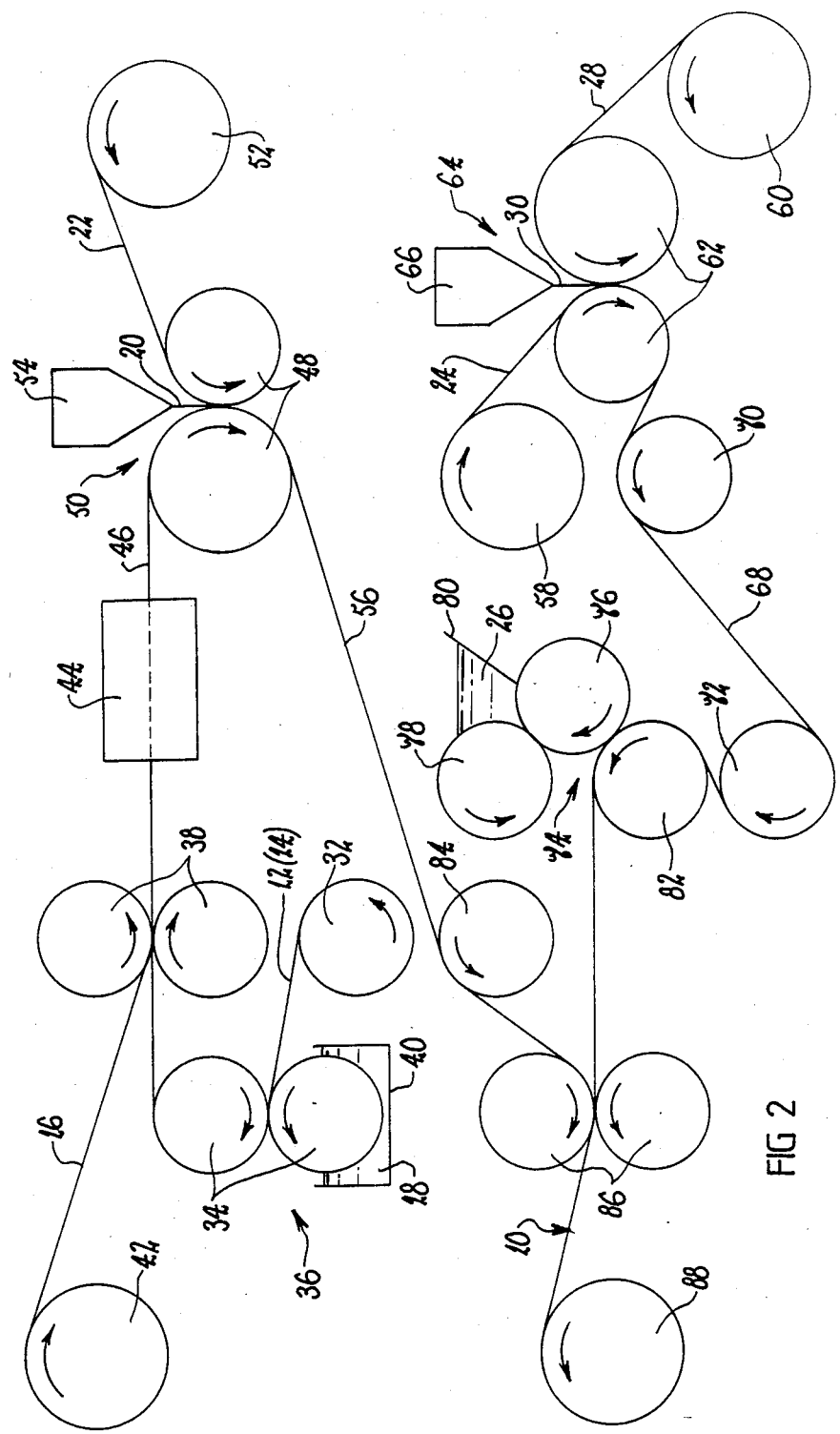

A preferred form of laminate now is described with reference to the drawings, in which:

FIG. 1 schematically shows a laminate in crosssection; the showing thereof being on a greatly enlarged scale; and FIG. 2 illustrates one arrangement for manufacturing a laminate as shown in FIG. 1.

Proceeding from the upper surface, the laminate 10 comprises an upper layer of aluminium foil 12, the top surface of which is provided with a thin coating 14 of ink or dye so as to reduce its reflectivity. Foil 12 is bonded to a layer of Kraft paper 16 by adhesive 18, such as a PVA adhesive. Layer of paper 16 is bonded by polyolefin adhesive 20 to a layer 22 of polyolefin fibrous material, layer 22 preferably being woven. The surface of layer 22 remote from adhesive 20 is bonded to a second layer of Kraft paper 24 by adhesive 26; the latter preferably being a fire-retardant grade. The laminate is completed by a second layer of aluminium foil 28, bonded to the layer of paper 24 by polyolefin adhesive 30.

Laminate 10 preferably is formed in an overall operation as depicted in FIG. 2, in which reference numerals of FIG. 1 have the same significance. As indicated foil 12 (having coating 14 previously applied to its outer surface) is drawn from supply roll 32 and passes through the nip of rollers 34 of adhesive coater 36. Foil 12 then is reversed over the upper one of rollers 34 to pass through the nip of combiner rollers 38. The lower one of rollers 34 rotates in bath 40 and takes up PVA adhesive from the latter for application to foil 12. Simultaneously, paper 16 is drawn from supply roll 42 and passes through the nip of rollers 38 for application against adhesive applied to foil 12. Paper 16 and foil 12 pass from rollers 38 through drying oven 44, to cure adhesive 18 therebetween to form laminate sub-assembly 46.

Sub-assembly 46 passes from oven 44, through the nip of rollers 48 of extrusion coater 50. Simultaneously, polypropylene fabric 22 is drawn from supply roll 52, and also passes through the nip of rollers 48. An extruder 54 of coater 50 extrudes a film 20 of polypropylene between the surface of paper 16, remote from foil 16, and the adjacent surface of fabric 22. Sub-assembly 46, fabric 22 and polypropylene film 20 therebetween thus is consolidated by rollers 48 to form laminate sub-assembly 56.

Simultaneously with formation of sub-assembly 56, Kraft paper 24 and aluminium foil 28 each is drawn from respective supply roll 58, 60. Each of paper 24 and foil 28 pass through the nip of rollers 62 of extrusion coater 64. At the same time, extruder 66 of coater 64 extrudes a film 30 of polyethylene toward the nip of rollers 62, between the opposed surfaces of paper 24 and foil 28; film 30 being consolidated with paper 24 and foil 28 to form laminate subassembly 68.

From coater 64, sub-assembly 68 passes over guide roller 70, and around roller 72 to reverse roll coater 74. The later has central and upper rollers 76, 78 at the nip of which dam 80 holds a supply of flame-retardant adhesive, such as a chlorinated paraffin containing antimony oxide. Rollers 76, 78 are reversely driven, with roller 76 rotating oppositely to sub-assembly 68 as the latter passes through the nip between roller 76 and a lower roller 82. Roller 78 acts to meter adhesive 26 carried from dam 80 on roller 76; with the adhesive then being applied to the paper 24 of subassembly 68.

Sub-assembly 56 passes from extrusion coater 50, over roller 84, through the nip of combiner rollers 86; fabric 22 of sub-assembly being lower-most. Sub-assembly 68 passes from reverse roll coater 74, through the nip of rollers 86, with adhesive 26 uppermost. Rollers 86 consolidate subassemblies 56, 68 and adhesive 26 therebetween, to form laminate 10 which passes to take up roll 88.

As will be appreciated, production of laminate 10 can be broken down into stages. Thus, sub-assembly 46 could pass from oven 44 to a take-up roll for later use; while sub-assembly 68 similarly could pass to a take-up roll; the two sub-assemblies 46, 68 subsequently being used to form laminate 10 in a third stage in which sub-assembly 68 is first passed through reverse roll coater 74. Alternatively, production of sub-assembly 46 can be followed, as described, to production of a subassembly 56; with the latter and sub-assembly 68 being formed prior to such third stage. In a further alternative, only one of sub-assemblies 46, 56, 68 need be produced in a first stage; with subsequent production through to formation of laminate 10 following in a second stage. In each of these situations, sub-assembly 46 can be replaced by a second quantity of sub-assembly 68, or vice versa.

In the foregoing, it will be appreciated that all arrows in FIG. 2 depict rotation. Also, while FIG. 1 approximates relative thicknesses of components of laminate 10 (albeit on an enlarged scale), thicknesses and increases thereof are not depicted in FIG. 2.

It is found that the laminate of the invention has superior properties compared with a laminate formed of similar layers and differing only in that it does not include a fibrous layer. The laminate of the invention shows, for example, superior results in the Beach puncture test, as well as having superior tensile strength and elongation, and exhibiting markedly superior tear resistance as measured by standard P.P.T. and edge tear tests. Where the laminate is produced on a machine providing continuous lengths of the laminate, the superior tensile strength, elongation and tear resistance is achieved in both the machine direction and cross direction. The laminate also displays a high resistance to delamination. Where the fibrous layer comprises or includes thermoplastic fibrous material, the laminate also exhibits in standard tests, conducted in accordance with AS 1530, a very low flame spread factor, and an excellent heat factor and flammability index. As will be appreciated, performance in these tests is enhanced by use of flame resistant grade adhesive as detailed above.

A laminate according to the invention particularly where provided with at least one outer layer of metal foil such as aluminium foil, is well suited to use as roofing insulation and/or sarking. In such application, its superior strength can be particularly advantageous. Thus, where it otherwise would be necessary to install a steel safety mesh for the safety of tilers, the strength of the laminate of the present invention is such that its use as roofing insulation and/or sarking, in place of conventional reflective foil laminate, enables such safety mesh to be dispensed with. That is, the laminate of the invention, particularly where the fibrous layer comprises woven thermoplastic fibers, has a strength providing equivalent safety for roof tilers to that afforded by the conventional safety mesh. The laminate, thus is useful in providing the dual function of roofing insulation and a safety layer, but at a significant overall cost saving both in material cost and in avoidance of the need for installation cost for the safety mesh.

Where the fibrous layer is woven material, the form of weave can vary. That is, the material can be of open, mesh form or it can be closely woven. Also, the fiber used can vary in denier with both the thickness of the fibrous layer and mesh form required, so as to achieve an overall balance of tensile strength, thickness and cost for the resultant laminate.

Finally, it is to be understood that various alterations, modifications and/or additions may be introduced into the constructions and arrangements of parts previously described without departing from the spirit or ambit of the invention.

The claims defining the invention are as follows:

1. A laminate material suitable for use in place of a safety mesh used in construction of roofing, the laminate having at least one inner layer comprising fibrous material adhesively bonded to each of the next adjacent layers; with each next adjacent layer being paper or metal foil, the laminate having at least one layer of paper, with at least one outermost layer being metal foil; said inner layer comprising fibrous material having a density of from about 30 to about 50 g/m$^2$ and comprising fibers of from about 30 to about 150 tex.

2. A laminate material according to claim 1, wherein at least one of the next adjacent layers is Kraft paper.

3. A laminate material according to claim 1 wherein at least one outermost layer is of metal foil.

4. A laminate material according to claim 3, wherein said metal foil is aluminium foil.

5. A laminate material according to claim 1 wherein said at least one inner layer comprises nonwoven fibrous material.

6. A laminate material according to claim 5, wherein said fibrous material is selected from fibre-glass, carbon fibre, polymeric fibrous materials, and cross-laminated airy fabric.

7. A laminate material according to claim 1 wherein said at least one inner layer comprises woven fibrous material.

8. A laminate material according to claim 7, wherein said fibrous material comprises thermoplastic material.

9. A laminate material according to claim 8, wherein said thermoplastic material is a polyolefin.

10. A laminate material according to claim 1 wherein said at least one inner layer has a density of from about 50 to about 120 g/m$^2$.

11. A laminate material according to claim 1 wherein said at least one inner layer comprises fibres of from about 50 to about 100 tex.

12. A laminate material according to claim 1 wherein adhesive providing bonding between at least two layers thereof is a fire-retardant grade.

13. A laminate material according to claim 12, wherein said adhesive is a chlorinated paraffin containing antimony oxide.

14. A laminat material according to claim 12 wherein said adhesive provides bonding between one surface of a said at least one inner layer and one adjacent layer.

15. A laminate material according to claim 14, wherein said at least one inner layer comprises polyolefin fibres and bonding between its other surface and the other adjacent layer is provided by extrusion coated polyolefin adhesive 16. A laminate material according to claim 14 wherein at least one adjacent layer comprises Kraft paper, with the inner layer being intermediate respective outermost layers each comprising aluminium foil.

17. A laminate material according to claim 16, wherein each adjacent layer comprises Kraft paper.

18. A laminate material according to claim 17, wherein each said adjacent layer is bonded to a respective said outermost layer by means of an adhesive selected from PVA, casein latex, acrylic, neoprene and extrusion coated polyolefin adhesives.

19. A laminate material according to claim 16, wherein one adjacent layer comprises Kraft paper, the other adjacent layer comprising a said outermost layer.

20. A laminate material according to claim 19, wherein said one adjacent layer is bonded to a respective said outermost layer by means of an adhesive selected from PVA, casein latex, acrylic, neoprene and extrusion coated polyolefin adhesives.

* * * * *

UNITED STATES PATENT AND TRADEMARK OFFICE
CERTIFICATE OF CORRECTION

PATENT NO. : 4,656,082
DATED : April 7, 1987
INVENTOR(S) : Stanley A. Goodacre and Anthony E. Blaubaum It is certified that error appears in the above-identified patent and that said Letters Patent is hereby corrected as shown below:

In Col. 1, line 14, for "other", read --others--.

In Col. 6, line 7, for "50", read --150--.

In Col. 6, line 41, for "laminat", read --laminate--.

Signed and Sealed this

Thirty-first Day of May, 1988

Attest:

DONALD J. QUIGG

Attesting Officer

Commissioner of Patents and Trademarks